Sept. 27, 1960 G. V. IRELAND 2,953,829
V-BELT FASTENER
Filed Jan. 7, 1959
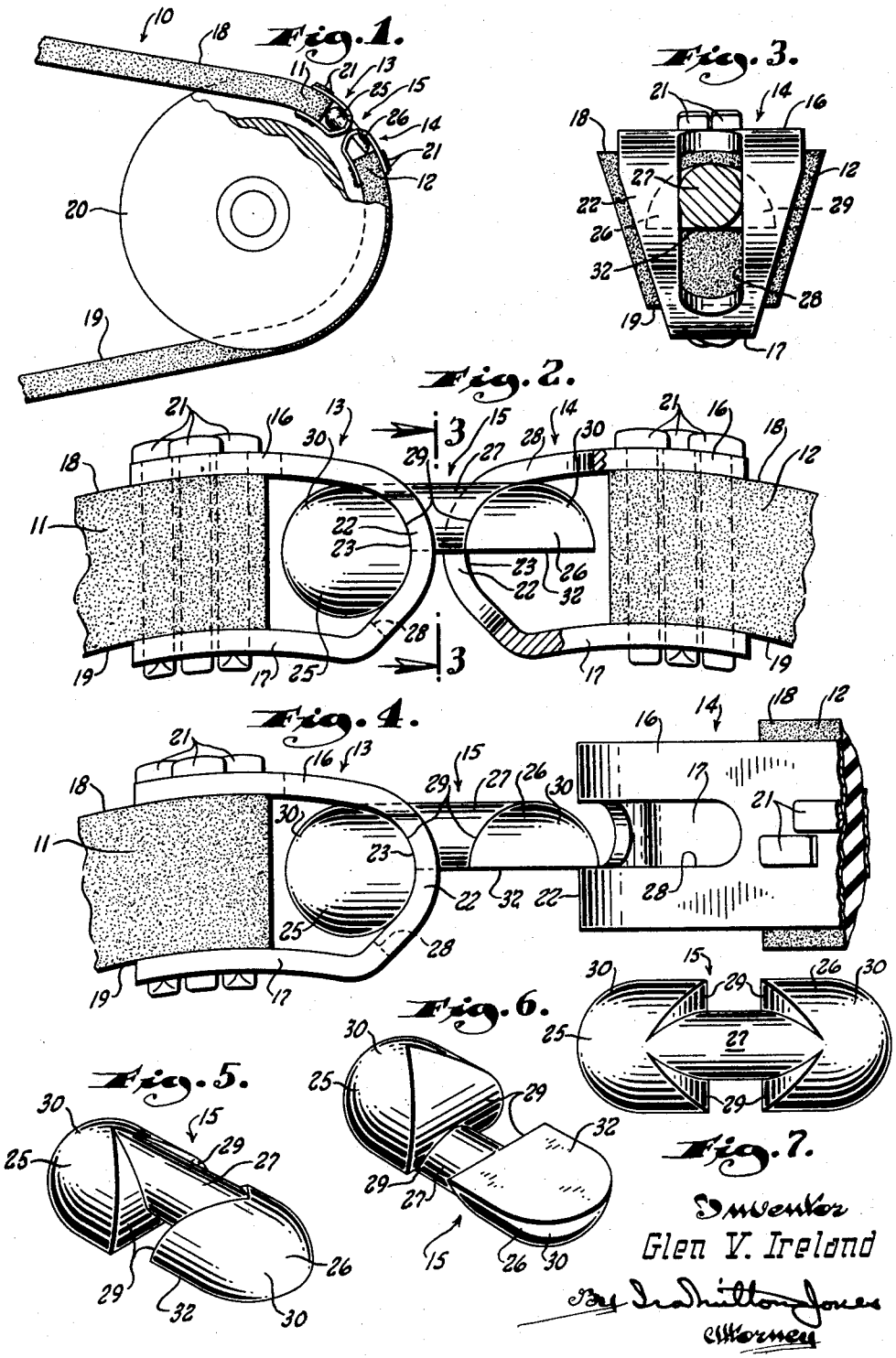
Inventor
Glen V. Ireland United States Patent Office 2,953,829
Patented Sept. 27, 1960

2,953,829
V-BELT FASTENER
Glen V. Ireland, 6605 W. Bennett Ave., Milwaukee, Wis.
Filed Jan. 7, 1959, Ser. No. 785,348
5 Claims. (Cl. 24—33)

This invention relates to V-belt drives and refers more particularly to detachable connectors for joining the opposite ends of a length of V-belting to form the same into an endless belt.

V-belt connectors of the type to which this invention pertains are now coming into widespread usage. They not only make possible the use of V-belt drives in many cases where endless belts could not be installed previously, but they also enable establishment and maintenance of belt drives in many types of machinery without the necessity of dismantling or disturbing the installation.

In general, V-belt fasteners or connectors comprise a bearing bracket or saddle permanently fixed to each end of a length of V-belting, and a link which detachably interconnects the bearing brackets or saddles and provides a double hinged joint therebetween by which the brackets may partake of relative hinging motion about each of two transverse axes intermediate the belt ends. Such hinging motion is, of course, necessary when the belt with the connector fastening its ends passes over V-pulleys about which the belt is trained.

Despite their advantages, past V-belt fasteners of the type herein concerned were deficient for a number of reasons. Some had an excessive number of parts which were not only difficult to assemble and disassemble, but because of their small size were easily lost during such assembly and/or disassembly. Others failed to provide for relative hinging motion of the saddles to the degree necessary for proper travel of the connectors around the smaller diameter pulleys.

Another serious disadvantage common to many proposed V-belt connectors was their inability to withstand the relatively large tension stresses that are encountered in high speed belt drives, nor did the connectors retain the load stresses centered on the belt axis during travel of the connector around the peripheries of the pulleys.

With these objections to past V-belt connectors in mind it is an object of this invention to provide an improved V-belt connector in which all of the above disadvantages are overcome and which, in addition, features a minimum number of simple and easy to produce parts, namely two bearing brackets or saddles which are secured to the belt ends, and a unitary link hingedly but readily detachably connecting the saddles.

More specifically, this invention has as its object to provide an improved V-belt connector of the character described wherein the unitary link by which the saddles are connected to one another has a unique dumbbell shape that promotes hinging motion of the saddles relative to the link and to one another, and also facilitates assembly and disassembly of the link with the saddles.

Still another object of this invention resides in the provision of an improved V-belt connector of the character described wherein the link is of particularly robust construction and thus capable of withstanding tension stresses many times those possible with connectors presently in use or proposed in the past.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of a length of V-belting having its opposite ends connected by a V-belt fastener of this invention, and showing the fastener traveling around the periphery of a pulley about which the belt is trained;

Figure 2 is an enlarged side elevational view of the V-belt connector of this invention;

Figure 3 is a cross sectional view taken through Figure 2 on the plane of the line 3—3;

Figure 4 is a side elevational view similar to Figure 2 but showing the positions the saddles must occupy before one of them can be connected with the link;

Figure 5 is a perspective view of the link per se, looking at the top thereof;

Figure 6 is a perspective view of the link per se, but looking at the underside of the link; and Figure 7 is a plan view looking down at the top of the link.

Referring now more particularly to the accompanying drawings in which like reference characters have been applied to like parts throughout the views, the numeral 10 generally designates a length of V-belting having opposite left and right end portions 11 and 12, respectively, separably joined together by a V-belt connector of this invention.

The V-belt connector comprises a pair of opposite but identical bearing brackets or saddles 13 and 14 respectively affixed to the left and right end portions of the belt, and a link 15 hingedly connecting the saddles. Each of the saddles is provided by a substantially U-shaped strap, bent flatwise to form concentrically curved outer and inner legs 16 and 17, respectively, between which an end portion of the V-belt is snugly received. The outer legs 16 of the saddles are wider than the inner legs 17 and overlie the wider outer faces 18 of the belt end. The narrower inner legs 17 engage over the inner faces 19 of the belt ends, and both the legs are narrower than the respective faces of the belt which they overlie so as to clear the converging side walls of a sheave or V-pulley 20 about which the belt may be trained.

The connectors are permanently secured to the belt ends by means of the customary nails 21 which are received in aligned holes in the outer and inner legs of each of the bearing brackets and are driven through the thickness of the belt. The heads on the nails may overlie the outer legs 16 of the saddles while their extremities are bent over or riveted against the exposed surfaces of the narrower inner legs 17 of the saddles.

The bight portions 22 of the saddles, from which the legs 16 and 17 extend, are spaced outwardly from the adjacent extremities of the belt ends and have their concave surfaces facing the belt ends and their convex surfaces facing one another. The concave portions of the saddle bights thereby provide bearing sockets 23 having cylindrical bearing surfaces disposed on axes transverse with respect to the belt ends, and which axes are substantially intersected by the neutral or central axis of the V belt.

One of the features of the V belt connector of this invention is that the two saddles are hingedly connected by a rigid link 15 of particularly robust construction, The link is of substantially dumbbell shape. It has bulbous heads or enlargements 25 and 26 which are journalled in the bearing sockets 23 of the saddles, and a cylindrical stem 27 joining the heads and extending lengthwise, in the direction of the belt axis, through relatively narrow slots 28 in the bight portions of both saddles. These slots are of uniform width, and extend completely around the bight portions of the saddles, and while they terminate short of the bases of the inner legs 17, they extend a distance into the base portions of the outer legs 16. The stem 27 of the link, of course, is loosely received in the slots 28.

The bulbous heads or enlargements 25 and 26 define opposing cylindrically surfaced abutments 29 that flank the ends of the stem 27 and mate with the concave surfaces of the bearing sockets 23.

Because of their cylindrically surfaced abutments 29, the bulbous heads or enlargements serve as pivot pins which are rotatably received in the bearing sockets provided by the bights of the saddles, so that each saddle is free to pivot up and down about a transverse axis, relative to the other saddle. To facilitate such hinging motion of the saddles, the remote portions of the bulbous heads or enlargements on the link are spaced a slight distance from the extremities of the belt and they are provided with spherical surfaces 30. The centers of these spherical surfaces lie on the axes of the opposing shoulders 29 of the enlargements, and in a vertical plane containing the axis of the stem 27 of the link. Consequently, as best seen in Figures 2 and 4, the bulbous heads or enlargements, when viewed from the side, appear to have a circular shape. The opposite side surfaces of the bulbous heads or enlargements, however, are cylindrical and tangent to the spherical surfaces 30. These side surfaces, of course, intersect the cylindrically surfaced abutments on the opposing portions of the enlargements.

Attention is directed to the fact that the stem 27 of the link is disposed eccentrically of the bulbous heads or enlargements 25 and 26, and that it has a diameter substantially equal to the radius of the spherical end portions of the heads. As shown best in Figures 2 and 4, the stem of the link is so joined to the bulbous heads or enlargements that the underside of the stem is substantially tangent to the common plane containing the axes of the cylindrically surfaced abutments 29 and the centers of the spherical end portions 30 of the heads, while the upper surface of the stem lies in a plane which is tangent to the top of the bulbous heads or enlargements. This eccentric disposition of the stem, in a direction away from the lower ends of the slots 28, assures maximum hinging motion of the saddles in directions to bring their narrower inner legs 17 toward one another. This follows by reason of the fact that the stem 27 of the link is normally located as far as practicable from the lower ends of the slots 28.

According to this invention the bulbous head or enlargement 26 has its bottom half slabbed off to define a flat surface 32 which lies in the plane containing the axes of the abutments 29. Consequently, the height of the bulbous head or enlargement 26 is equal to the diameter of the stem 27 of the link, and all portions of the stem and the slabbed off head 26 lie within planes that are parallel to the axes of the shoulders 29 and are spaced apart a distance slightly less than the width of the slots 28 in the saddles. This assures easy attachment and detachment of the link with respect to the saddles.

Referring to Figure 4 it will be noted that the slabbed-off head 26 of the link can be passed through the slot 28 in the righthand saddle 14 only when the saddles have been rotated relatively to one another about the belt axis through an angle of 90°, to dispose the side edges of the slot 28 in the saddle 14 in parallelism with the flat underside 32 of the head 26 on the link.

During installation of the connector to a V belt, the saddle 13 is secured to the lefthand end of the belt after passing the flattened head 26 on the link and the stem 27 through the slot 28 in the saddle 13 to seat the head 25 in its socket. The saddle 13 is secured to the belt end in such a way that only a slight clearance exists between the enlargement 25 and the adjacent extremity of the belt when the cylindrically surfaced shoulders 29 on the head 25 are properly seated in the bearing socket provided by the bight of the saddle. While the head 25 is held engaged in its socket with the fingers of the left hand, the slabbed off head 26 may then be passed through the slot 28 in the saddle 14 while the latter is held in a position such as illustrated in Figure 4, until the convex portions of the bights on the saddles abut one another. Before the righthand saddle 14 can be thereafter rotated about the stem 27 of the link to its position seen in Figure 2 at which the righthand enlargement 26 on the link is fully engaged in its bearing socket, it must first be rocked about an axis which is normal to the flat underside 32 of the slabbed off head 26 in order to bring the upper leg 16 of the saddle to near parallelism with the axis of the cylindrically surfaced shoulder 29 on the head 26. This brings the stem 27 of the link to a position near the end of the slot in leg 16 and frees the saddle 14 for rotation about the stem 27 of the link without interference from the corners at the ends of the shoulder 29, to a posiiton at which its bearing socket registers with the cylindrically surfaced abutments 29 on the head 26, and is free to be tilted downwardly about the latter to its normal position seen in Figure 2. It should also be observed that when the head 26 on the link is engaged in its bearing socket, it also only slightly clears the adjacent extremity of the belt.

It is of the essence of this invention that the particularly robust construction of the link 15 enables it to withstand far greater tension stresses than were possible with previously proposed V-belt connectors. In this connection it should be observed that the lengths of the bulbous heads or enlargements 25 and 26, measured in the direction of the stem axis, are approximately twice the diameter of the stem. This assures against any tendency for the shoulders 29 to shear off along lines which converge lengthwise of the stem from the zones of its intersection with the flanking abutments 29, despite subjection of the link to great tension stresses during use of the connector.

As stated previously, the legs 16 and 17 of the saddles are flatwise concentrically curved. Preferably the radius of their curvature is made substantially equal to that of the smallest V pulley about which connectors of any given size are to pass over in use, and the saddles are secured to the belt ends with their concave surfaces facing inwardly.

It is also desirable to form the bearing sockets 23 provided by the bight portions of the saddles with their centers of curvature slightly closer to the outer legs 16 of the saddles than to the inner legs 17. This slightly off-center relationship between the bearing sockets and the legs of the saddles is important by reason of the fact that it assures the maintenance of load stresses as closely as possible to the center line or neutral axis of the belt regardless of whether the connector is traveling along a straight stretch between pulleys, or is passing around the circumference of the pulleys about which the belt is trained.

From the foregoing description taken together with the accompanying drawing it will be readily apparent to those skilled in the art that this invention provides a V belt connector consisting of a minimum number of parts having particularly robust construction, and featuring ease of assembly and disassembly of said parts to facilitate the application of V belting to various pulley drives.

What is claimed as my invention is:

1. A connector for detachably joining the ends of a length of V belting comprising: a pair of substantially U-shaped saddles each having inner and outer legs engageable over the flat inner and outer faces of one end portion of a length of V belting to enable the saddle to be secured thereto, and a curved bight portion joining the ends of said legs and providing a cylindrically surfaced socket, the bight portion of each saddle having an elongated slot of uniform width therein extending generally crosswise of the socket axis from near the base of one leg to a point a substantial distance beyond the base of the other leg; and a substantially dumbbell shaped link having a stem projecting substantially loosely and rotatably through the slots, and substantially large bulbous heads on the opposite ends of the stem, said heads having opposing cylindrically surfaced abutments that flank the stem, spaced apart a distance only slightly greater than the combined thickness of the bight portions of the saddles, and rotatably seat in said sockets to serve as transverse hinge pins and by their spacing normally constrain the saddles to relative hinging motion, one of said heads lying entirely within a pair of planes that are parallel to the axes of the stem and the cylindrically surfaced abutments on the heads and tangent to opposite sides of the stem so that said one head can be passed through the slot in its saddle when the saddle is in a detaching position at which the sides of the slot are parallel to said planes; said heads being elongated in directions lengthwise of the stem axis and away from their cylindrically surfaced abutments by distances substantially greater than the width of the stem to provide assurance against shearing of the heads as a result of high tension stresses imposed upon the link; and said one head terminating in a substantially rounded surface so that when the saddle in which said head is engaged is secured to one end portion of a length of V belting with the extremity of the belt spaced from the bight of the saddle by a distance only slightly greater than the axial length of said one head, said head cannot be disengaged from the saddle until the latter is swung about the cylindrically surfaced abutments on said head to dispose its legs substantially normal to the stem, and the saddle is thereafter rotated about the stem to dispose it with the sides of its slot parallel to said planes.

2. The connector of claim 1 further characterized by the fact that the stem and said one head lie entirely to one side of a plane containing the axes of said cylindrically surfaced abutments on the heads.

3. The connector of claim 2, further characterized by the fact that the saddle legs at one side of said last named plane are wider than the saddle legs at the opposite side of said plane, and wherein the eccentricity of the link stem is such as to normally dispose the same closer to the wider saddle legs and remote from the narrower saddle legs.

4. The connector of claim 3, further characterized by the fact that the sockets provided by the bights of the saddles are also eccentric with respect to the space between their legs, their axes being disposed closer to the wider saddle legs so as to assure a substantial degree of hinging motion of the saddles in directions to carry the narrower legs of the saddles toward one another.

5. A connector for detachably joining the ends of a length of V belting comprising: a pair of substantially U shaped saddles each having opposite concentrically curved inner and outer legs joined by an outwardly bowed bight, the concave inner surface of which provides a socket located closer to the outer leg than to the inner leg of the saddle, said legs being engageable over the flat inner and outer faces of a length of V belting, at the ends of the latter, to provide for securement of the saddles to the belt ends, the inner legs of the saddles being narrower than the outer legs and all of said legs being narrower than the faces of the V belt with which the legs are adapted to engage; the bight portion of each saddle having an elongated slot of uniform width therein extending generally crosswise of the socket axis from near the base of the narrower leg to a point a distance beyond the base of the outer leg; and a substantially dumbbell shaped link detachably interconnecting said saddles with their bight portions in closely opposed relation and their sockets on parallel transverse axes, said link having a cylindrical stem which projects loosely through the slots in the bights of both saddles, and bulbous enlargements on the opposite ends of the stem having convex cylindrically surfaced abutments that flank the stem and seat in said sockets so that the enlargements serve as transverse hinge pins to provide for relative hinging motion between the saddles, one of said bulbous enlargements being slabbed off at its underside to provide a flat surface which lies in a plane that contains the transverse axes of the cylindrically surfaced abutments, and the stem of the link being eccentrically disposed with respect to said bulbous enlargements, with the entire stem lying to one side of said plane containing the flat underside of said one enlargement and so as to be located close to the wider outer legs of the saddles and remote from the ends of the slot which are adjacent to the bases of the narrower legs of the saddles, so as to thereby provide for maximum hinging motion of the saddles in directions to carry their narrower legs toward one another.

References Cited in the file of this patent

UNITED STATES PATENTS 2,181,232    Olsen                   Dec. 5, 1939

FOREIGN PATENTS 191,135    Great Britain           June 4, 1923
838,164    France                   Nov. 28, 1938